United States Patent

[11] 3,622,486

| [72] | Inventors | George E. F. Brewer<br>Novi;<br>Robert A. Swider, Livonia, both of Mich. |
|---|---|---|
| [21] | Appl. No. | 884,446 |
| [22] | Filed | Dec. 12, 1969 |
| [45] | Patented | Nov. 23, 1971 |
| [73] | Assignee | Ford Motor Company<br>Dearborn, Mich. |

[54] ANODIC DEPOSITION OF FRIT IN DUAL ENVELOPE
1 Claim, 1 Drawing Fig.

| [52] | U.S. Cl. | 204/181 |
|---|---|---|
| [51] | Int. Cl. | B01k 5/02, C23b 13/00 |
| [50] | Field of Search | 204/181 |

[56] References Cited
UNITED STATES PATENTS

| 3,304,250 | 2/1967 | Gilchrist | 204/181 |
|---|---|---|---|
| 3,450,655 | 6/1969 | Spiller | 204/181 |
| 3,484,357 | 12/1969 | Plankenhorn | 204/181 |

Primary Examiner—Howard S. Williams
Attorneys—John R. Faulkner and Olin B. Johnson

ABSTRACT: An improved method is provided for electrodepositing particulate ceramic frit upon an electrically conductive substrate which comprises enveloping the frit particles in a double envelope consisting of an inner coating of anionic resin and an outer coating of cationic resin, forming an aqueous dispersion of the thus-coated frit and an anionic binder resin, and anodically depositing the coated frit and the anionic binder resin upon the substrate. The coated substrate can then be fired to volatilize and drive off all resinous material and convert the electrodeposited frit particles into a continuous film.

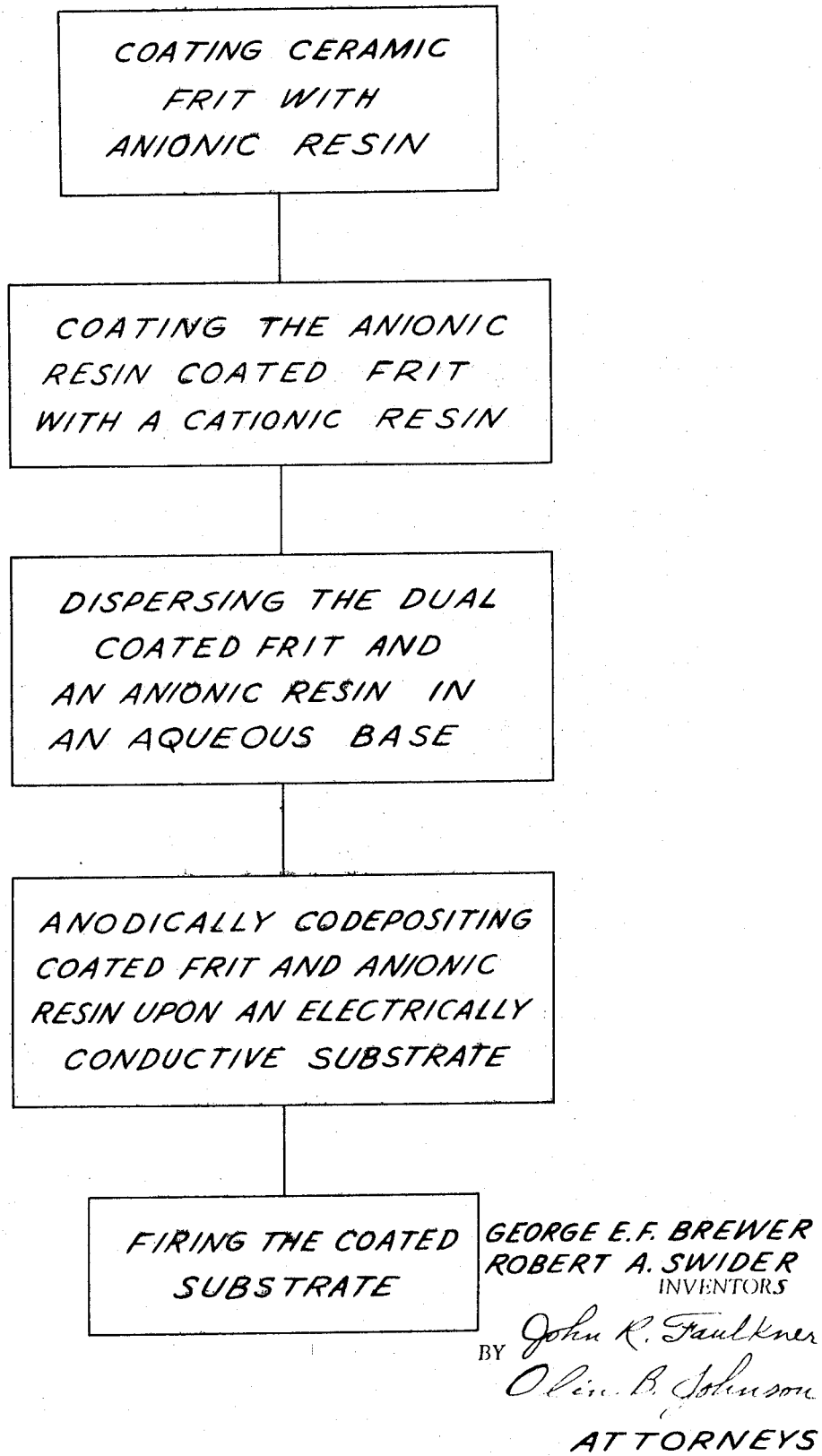

ANODIC DEPOSITION OF FRIT IN DUAL ENVELOPE

BACKGROUND OF THE INVENTION

Anodic deposition of particulate material with an anodically depositable resin is well known to the art from the many publications relating to the electrodeposition of paint, e.g., U.S. Pat. No. 3,230,162, the teachings of which are incorporated herein by reference.

In our copending U.S. Pat. application Ser. No. 825,589, we disclose the electrodeposition of ceramic frit and state that many of essentially uncharged particles impart alkalinity or acidity to the coating bath and thereby interfere with the maintenance of bath stability. One method suggested therein for preventing this was to encapsulate the frit particles in organic material with which they are to be codeposited.

THE INVENTION

In the electrodeposition of ceramic frit (glass or crystalline), from an aqueous bath onto an electrically conductive substrate, bath life can be substantially prolonged if the frit is first encapsulated with a double envelope consisting of an inner coating of anionic resin and an outer coating of cationic resin and subsequently anodically codepositing the coated frit with an anionic resin.

The steps of the method of this invention are illustrated sequentially in the accompanying drawing.

DETAILED DESCRIPTION

The term "cationic resin" is used herein to refer to an organic resin having functional groups in its molecular structure which ionize in an aqueous acidic bath to form positive ionic sites thereon. When intimately dispersed in such a medium, such resins have affinity for the cathode of an electrodeposition cell.

The term "anionic resin" is used herein to refer to an organic resin having functional groups in its molecular structure which ionize in an aqueous basic bath to form negative ionic sites thereon. When intimately dispersed in such a medium, such resins have affinity for the anode of an electrodeposition cell.

The anionic resins used herein are synthetic polycarboxylic acid resins, i.e., organic resins having free or ionizable carboxyl groups in their molecular structure which are derived from a constituent monomer. Acidic film-forming resins include, but not by way of limitation, any of the polycarboxylic acid resins used in the electrodeposition of paint from an aqueous bath. They include coupled oils such as sunflower, safflower, perilla, hempseed, walnut seed, dehydrated castor oil, rapeseed, tomato seed, menhaden, corn, tung, soya, oiticia, or the like, the olefinic double bonds in the oil being conjugated or nonconjugated or a mixture, the coupling agent being an acyclic olefinic acid or anhydride, preferably maleic anhydride, but also crotonic acid, citraconic acid, or anhydride, fumaric acid, or an acyclic olefinic aldehyde or ester of an acyclic olefinic ester such as acrolein, vinyl acetate, methyl maleate, etc., or even a polybasic acid such as phthalic or succinic, particularly coupled glyderide oils that are further reacted with about 2 to about 25 percent of a polymerizable vinyl monomer; maleinized unsaturated fatty acids; maleinized resin acids, alkyd resins, e.g., the esterification products of a polyol with polybasic acid, particularly glyceride drying oil-extended alkyd resins; acidic hydrocarbon drying oil polymers such as those made from maleinized copolymers of butadiene and diisobutylene; diphenolic acid and like polymer resins; and acrylic vinyl polymers and copolymers having carboxylic acid groups such as butyl acrylate-methyl methacrylate-methacrylic acid copolymers, acrylic acid and lower alkyl ($C_1$ to $C_4$) substituted acrylic acid-containing polymers, i.e., those having carboxyl groups contributed by alpha-beta unsaturated carboxylic acids or residues of these acids, etc. These and other suitable resins are described in detail in many patents of which the following are illustrative: U.S. Pat. Nos. 3,230,162; 3,335,103; 3,378,477 and 3,403,088. These acidic resins are dispersed in an aqueous bath with the assistance of a water soluble base, e.g., water soluble amines, ammonia, potassium hydroxide, lithium hydroxide, etc., and with agitation. Anodic deposition in accordance with this invention is effected at an impressed electrical potential in the range of about 50 to about 500 (DC) volts or higher.

The cationic film-forming resin may be a polymer having one or more primary, secondary or tertiary amine groups in its molecular structure.

Both the anionic and cationic film-forming materials must be materials that will vaporize during the firing cycle through which the particulate frit is converted to a continuous film without leaving carbonaceous deposit. This vaporization should take place at temperatures below about 1,500° F., preferably below 1,000° F.

The method of this invention will be more fully understood from the following illustrative example:

Anodic deposition of particulate material is carried out with the materials and methods hereinafter set forth:

1. Formation of Anionic Resin Envelope
   a. to 21.7 parts by weight of anionic acrylic resin [I] (as 70 percent nonvolatiles in butyl cellosolve), 1.6 parts by weight neutral epoxy resin (diglycidyl ether of bisphenol A reacted with $C_{18}$ fatty acids as 50 percent nonvolatiles in xylol) and 0.7 parts by weight diethyl amine are mixed and triturated.
   b. to 1 (a) are added 776 parts by weight water with agitation, and 240 parts by weight 400-mesh ceramic frit
   I. This resin is prepared from the following materials in the following manner:
      a. to a reaction vessel is charged 900 parts by weight butyl cellosolve and the same is heated to 140° C.
      b. while maintaining this temperature, there is added dropwise over a 3.5 hour period a mixture of

| Parts by Weight | |
|---|---|
| 226 | methacrylic acid |
| 630 | 2-ethyl hexyl acrylate |
| 1,034 | styrene |
| 210 | hydroxy ethyl methacrylate |
| 21 | axobisisobutyronitrile | c. after addition is complete, the temperature of 140° C. was held for 0.5 hour and the resin recovered. The resin has an acid value of about 71 and an X-Y Gardner-Holdt viscosity at 50 percent solids in butyl cellosolve.
   c. to the suspension of 1 (b) are added 20 parts by weight concentrated (36 percent) hydrochloric acid diluted with 540 parts by weight water.
   d. the liquid is decanted from 2 (a) and the coated frit comprising residue is washed with water.

2. Formation of the Cationic Resin Envelope
   a. to the solids (coated frit) of 1 (d)—about 256 parts by weight—are added 625 parts by weight deionized water thus providing
   b. 21.7 parts by weight of cationic acrylic resin [II] (as 70 percent nonvolatiles in butyl cellosolve), 1.6 parts by weight neutral epoxy resin (diglycidyl ether of bisphenol A reacted with $C_{18}$ fatty acids as 50 percent nonvolatiles in xylol) and 1.3 parts by weight glacial acetic acid are triturated.
   c. One hundred thirty-five parts by weight water are added to the mix of 2 (b) and this dispersion is worked into water and coated frit of 2 (a).
   d. under agitation there is added to the dispersion of 2 (c) 1.46 parts by weight NaOH in about 540 parts by weight water.
   e. the liquid is decanted from the dispersion of 2 (d) and the dual-enveloped frit is washed with water giving about 272 parts by weight solids.

3. Preparation of the Coating Bath of Dual-Coated Frit and Anionic Resin
   a. to 21.7 parts by weight of the anionic acrylic resin (same as used for first or inner envelope or first—as 70 percent nonvolatiles in butyl cellosolve) and 1.6 parts by weight neutral epoxy resin (diglycidyl ether of bisphenol A reacted with $C_{18}$ fatty acids—as 50 percent nonvolatiles in xylol) are added 0.7 diethyl amine and these materials are triturated.
   b. to the mix of 3 (a) are added 126 parts by weight water and the dual-coated frit (272 parts by weight) of 2 (e) and agitation of this bath is continued.
4. Electrodeposition of the Coated Frit The dispersion of 3 (b) containing the dispersed coated frit and the dispersed anionic resin is employed as the coating bath of an electrodeposition cell and the coated frit and anionic resin are electrodeposited upon an electrically conductive workpiece, i.e., a steel panel serving as the anode (relatively positive electrode) of the electrodeposition cell. A difference of electrical potential of 200 volts is impressed between the anode and the cathode of the electrodeposition cell for 2 minutes. A deposit having an average depth of about 50 mils (0.060 inch) is found on the anode. This same coating bath is maintained under agitation for about 464 hours and electrodeposition is again carried out under the same conditions. The deposit is again about 200 volts indicating no evidence of bath deterioration.

It will be understood by those skilled in the art that modifications can be made in the foregoing illustrative examples within the spirit and scope of this invention as expressed in the appended claim.

We claim:

1. In a method for codepositing particulate ceramic frit and anionic organic resin from an aqueous dispersion thereof serving as coating bath of an electrodeposition cell onto an anode of said cell immersed in said coating bath by passing direct current through said bath between said anode and a cathode spaced apart from said anode and in contact with said coating bath, the improvement which comprises in combination (a) coating the frit particles with an inner envelope of anionic resin, (b) coating said inner envelope with an outer envelope of cationic resin, (c) intimately dispersing the resultant dual coated frit with anion forming polycarboxylic acid resin and a water soluble base in said coating bath and (d) electrodepositing said dual coated frit and said polycarboxylic acid resin upon said anode.

* * * * *